United States Patent

[11] 3,626,193

[72] Inventors Yasuo Ishihara;
Takao Ando; Tukasa Akahoshi, all of Tokyo, Japan

[21] Appl. No. 57,291
[22] Filed July 22, 1970
[45] Patented Dec. 7, 1971
[73] Assignee Nippon Electric Co., Ltd. Tokyo, Japan
[32] Priorities July 29, 1969
[33] Japan
[31] 44/60242;
Sept. 10, 1969, Japan, No. 44/72247

[54] RANDOM ACCESS SOLID-STATE IMAGE SCANNER
14 Claims, 10 Drawing Figs.

[52] U.S. Cl. .... 250/209, 178/7.1, 307/311, 315/169 R
[51] Int. Cl. .... H01j 39/12
[50] Field of Search .... 178/7.1; 340/166; 307/311; 315/169 R, 169 TV; 250/211 J; 317/235 N; 250/209

[56] References Cited
UNITED STATES PATENTS

| | | | |
|---|---|---|---|
| 3,378,688 | 4/1968 | Kabell | 250/209 |
| 3,487,263 | 12/1969 | Pahlavan | 315/169 R |
| 3,488,508 | 1/1970 | Weimer | 307/311 |
| 3,517,258 | 6/1970 | Lynch | 315/169 R |

*Primary Examiner*—Robert L. Griffin
*Assistant Examiner*—George G. Stellar
*Attorney*—Sandoe, Hopgood and Calimafde

ABSTRACT: An image scanner adapted for random-access and semirandom-access scanning (of a document, e.g.) comprises an array of photodiodes each having one terminal respectively connected to a plurality of field-effect transistors and another terminal receiving a sawtooth wave. The gates of the transistors receive control voltages according to a predetermined voltage gradient. The voltage gradient is in turn selectively controlled by a control signal, to thereby establish the point at which scanning begins.

INVENTORS
YASUO ISHIHARA
TAKAO ANDO
TUKASA AKAHOSHI
by
Sandoe, Hopgood & Calimafde
ATTORNEYS

*INVENTORS*
YASUO ISHIHARA
TAKAO ANDO
TUKASA AKAHOSHI
*by*
*Sandoe, Hopgood & Calimafde*
ATTORNEYS INVENTORS
YASUO ISHIHARA
TAKAO ANDO
TUKASA AKAHOSHI
by
Sandoe, Hopgood & Calimafde
ATTORNEYS

RANDOM ACCESS SOLID-STATE IMAGE SCANNER

This invention relates generally to image scanners, and more particularly to an image scanner for use in image pickup, facsimile, and character recognition.

A moving aperture, an electron beam, and a light beam have been commonly employed to perform image scanning. Among these known approaches to the problem of image scanning, electron beam scanning has generally been regarded as the most reliable and favorable. However, as a result of the rapid development of integrated circuit techniques, attempts have been made to develop a practical solid state image scanner. Also, recent developments in the field of optical character recognition systems have created a great demand for a significantly simplified image scanning device.

Scanning systems that have heretofore been proposed for solid state image pickup devices can be classified into two types. One is based on the combination of a photodiode matrix and tapped delay circuits connected to a pulse source, and the other comprises a combination of a photodiode array and a bleeder coupled to a scanning sawtooth source. In the former, a great number of active and passive circuit elements are needed, with the result that the device as a whole is complicated in structure and difficult and costly to manufacture, along with insufficient reliability and short useful life.

The solid state image scanner of the latter type is called a "-scanistor," and was developed by International Business Machines Corporation. A detailed description of the scanistor is given in the Proceedings of the IEEE, Vol. 52, No. 12 (Dec. 1964), pages 1513 to 1528. Briefly, in the scanistor, the switching diodes interconnected with the photodiodes are forward and reverse biased by a scanning voltage. More specifically, the switching diode of each of the parallel connected photodiode-switching diode pairs is initially reverse biased. The sawtooth voltage is then applied to the diode pairs, to thereby sequentially turn the switching diodes into the forward-biased state. This results in the sequential turning of the photodiodes into the reverse biased state. During the scanning period, the scanning current is subjected to variations depending on the brightness of the elementary images projected respectively on the photodiodes. The scanistor should, however, be formed of a bipolar device to be readily realized in the form of an integrated circuit. A multilayer structure should therefore be employed in order to form the switching diodes and photodiodes within a single substrate. This, however, unavoidably presents difficulties in the actual manufacturing process of the scanistor.

In order to simplify the manufacturing process, a description of an improved solid state image scanner is made in copending application Ser. No. 856,723 filed on Sept. 10, 1969, and assigned to assignee of the present application. The proposed scanner employs in place of the bleeder diodes, a plurality of metal-insulator-semiconductor (MIS) type FET's, each in diode connection. The MIS FET structure of said copending application is readily adapted to integrated circuit configuration as compared to the conventional scanistor. However, with the scanning device disclosed in said application, only a regular unidirectional scanning operation is possible, in which the scanning is started at one end of a document or image and finished at the other. This is due to the fact that each of the FET's is in diode connection. That scanning device is thus not adapted to a random-access scanning or semirandom-access scanning, in which the scanning is initiated at any point along the photodiode array.

On the other hand, there is an increasingly great demand for random-access and/or semirandom-access scanning largely as a result of the development of optical character recognition (OCR) technology. For example, a document to be subjected to OCR does not always have a well balanced format. There are some cases where the message is printed on the left-hand or right-hand side in one part of a document, and on the right-hand or left-hand side in another part of that document. Thorough scanning of such documents by the conventional devices is time-consuming and ineffective. Random access is favorable in such a case for switching from one scanning mode (restricted to the left-hand side, for example) to another (restricted to the right-hand side).

It is therefore an object of the present invention to provide a solid state scanner of the modified scanistor type, particularly well adapted to random-access and semirandom-access scanning.

In the scanning device of the present invention, the FET's employed as the bleeder means are not in the diode connection as in the device of said copending application, but are rather in the transistor connection. More specifically, in the present device, the cathodes of the photodiode array are connected in common to a sawtooth wave source, while the anodes of the photodiode array are connected in common to the source electrodes of the FET's on the bleeder side. The gate electrodes of the FET's are connected to a DC voltage source, while the drain electrodes of the FET's are connected in common to a differentiating circuit for the separation of the video signal component. To one end of the tapped resistor is connected a control voltage source which generates a control signal synchronized with the sawtooth wave. The control voltage is, in its effect, superimposed on the sawtooth wave and causes a change in the time point in each of the scanning periods at which a particular one of the FET's is turned to the conductive state. As long as the control signal is not effectively superimposed on the sawtooth wave, scanning is performed from one end of the photodiode array to its other end.

To the accomplishment of the above and to such further objects as may hereinafter appear, the present invention relates to a solid state image scanner substantially as defined in the appended claims and as described in the following specification taken together with the accompanying drawings in which:

Figure 1:
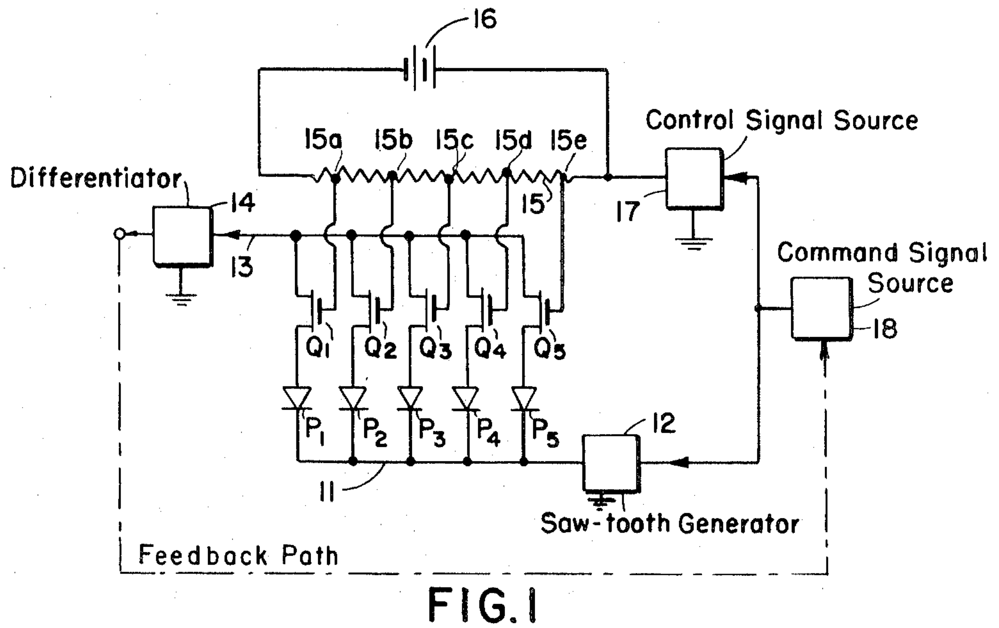
FIG. 1 is a schematic diagram partly in block form of an image scanner according to a preferred embodiment of the present invention.
Figure 5:
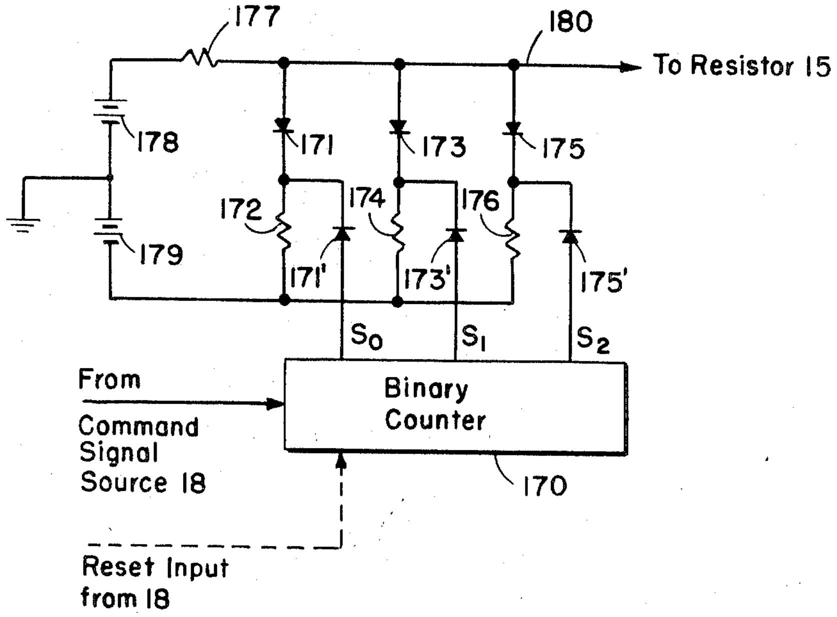
Figure 6:
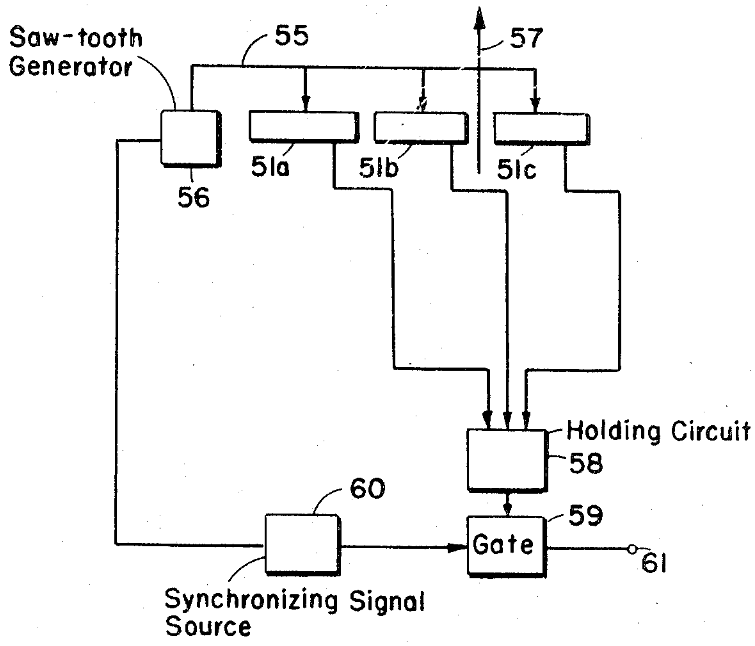

FIGS. 3*a*–3*c* and 4*a* to 4*c* are waveform diagrams for further describing the device of FIG. 1;

FIG. 5 is a schematic diagram partly in block form of a detailed structure of a part of the device of FIG. 1; and FIG. 6 is a schematic diagram in block form of a modification of the embodiment of FIG. 1.

Referring to FIG. 1, the image scanner device of the present invention is disclosed with respect to an embodiment thereof which comprises an array of photodiodes $P_1$, $P_2$, $P_3$, $P_4$, and $P_5$. The cathodes of photodiodes $P_1$–$P_5$ are connected by a lead 11 in common to a sawtooth wave generator 12, and the anodes of these photodiodes are respectively coupled to the source electrodes of P-channel enhancement type MIS FET's $Q_1$, $Q_2$, $Q_3$, $Q_4$, and $Q_5$. The drain electrodes of FET's $Q_1$–$Q_5$ are connected in common by a lead 13 to a differentiating circuit 14. The gate electrodes of FET's $Q_1$–$Q_5$ are coupled respectively to taps 15*a*, 15*b*, 15*c*, 15*d* and 15*e* of a resistor 15, across which a DC power source 16 having an output voltage level $V_B$ is coupled.

The spatial interval between taps 15*a*, 15*b*,...., and 15*e* is substantially equal, so that there is a substantially equal differences in the DC voltages respectively appearing at these taps. A control signal source 17 is coupled to the end of resistor 15 near the tap 15*e*. Sawtooth wave generator 12 and control signal source 17 are connected to a synchronized command signal source 18 so that the sawtooth wave and the control signal are controlled in a predetermined time relationship.

Figure 2:
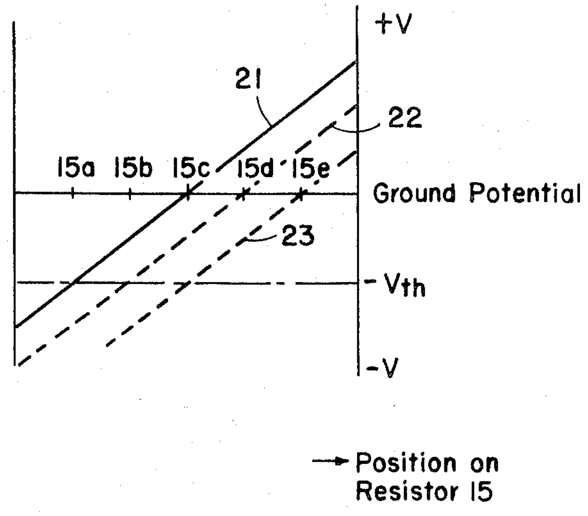
FIG. 2 illustrates a voltage distribution characteristic for describing the operation of the image scanner of FIG. 1.

Referring to FIG. 2, the spatial position on resistor 15 is plotted along the abscissa, while the voltage is plotted along the ordinate. As will be seen from the drawing, the voltage appearing across every two neighboring resistor taps 15*a* and 15*b*, 15*b* and 15*c*, and so on, is set at $(1/2)V_{th}$, where $V_{th}$ is the gate threshold voltage of each of the FET's Q1–Q5. Assuming that the control voltage (to be described later) supplied from signal source 17 is of such a constant value that makes the voltage of tap 15*c* zero, the voltage distribution on resistor 15 is as shown by a straight line 21. In this state, the sawtooth wave generator 12 generates the sawtooth wave.

Figure 3:
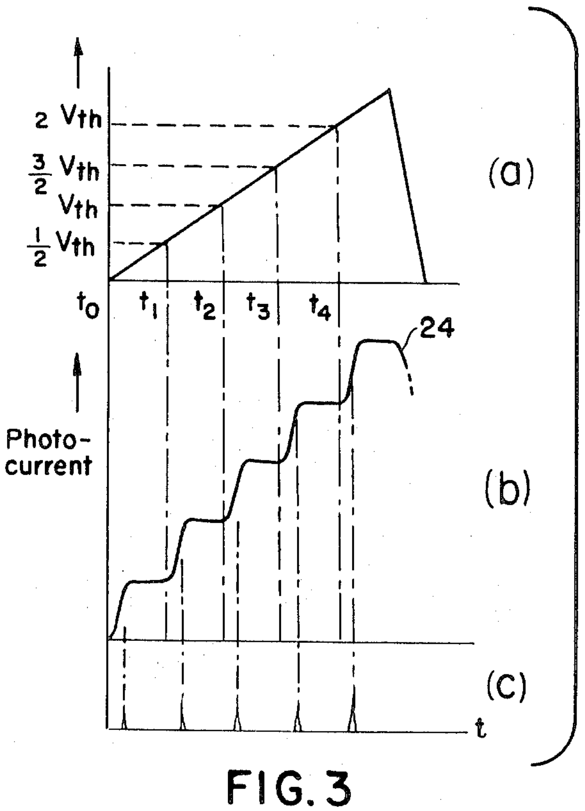

FIG. 3(*a*) shows such a sawtooth wave voltage as plotted against time. As is shown, the time gradient or slope of the rising straight line of FIG. 3(*a*) is made exactly identical to that of line 21 in FIG. 2. On the same scale, FIG. 3(*b*) shows the total photocurrent characteristic curve 24 observed at the lead 13 (FIG. 1), and FIG. 3(*c*) shows the time-differentiation of curve 24 observed at the output of the differentiating circuit 14.

Continuing to refer to FIGS. 3(*a*), (*b*) and (*c*), the lead 11 is kept at zero potential at time point to. Therefore, except for FET $Q_1$ which is supplied at terminal 15*a* with a voltage $-V_{th}$, FET's $Q_2$–$Q_5$ are all kept in the off state, with their gate electrodes maintained at voltages higher than the threshold level (It should be noted here that these FET's are of the P-channel enhancement type, which are kept in the off state when the gate voltage is higher than the threshold value). Under this state, however, the photodiode $P_1$ is not sufficiently reverse biased to reach the photosensing state. With the lapse of time after point $t_o$, the reverse biasing of diode $P_1$ is increased to bring the diode $P_1$ into the photosensing state, while the gate biasing voltage of FET $Q_1$ reaches the threshold value to turn it to the "on" or conductive state whereupon the output current of diode $P_1$ appears on output lead 13. The increment of the photocurrent is sensed by differentiating circuit 14.

With the rise of the sawtooth wave, photodiodes $P_2$–$P_5$ are sufficiently reverse biased to reach their photosensing state. On the other hand, FET's $Q_2$–$Q_5$ are respectively kept in the off state until the lapse of a certain length of time from the time points of the turning on of diodes $P_2$–$P_5$ into their photosensing state. More specifically, at time point $t_1$, the sawtooth wave reaches a voltage level $(1/2)V_{th}$, bringing the gate voltage of FET $Q_2$ to the threshold value $V_{th}$. Therefore, the photocurrent representative of the light value at diode $P_2$ appears at lead 13 after the lapse of a certain length of time from time point $t_1$. This increment of the photocurrent is sensed by diode $P_2$. Likewise, at time points $t_2$, $t_3$, and $t_4$, FET's $Q_3$, $Q_4$, and $Q_5$ are respectively turned to the conductive state, thereby causing the photocurrent at lead 13 to change as shown in FIG. 3(*b*). The increments of the video components of the photocurrent are sensed by the differentiating circuit 14 as shown in FIG. 3(*c*).

Figure 4:
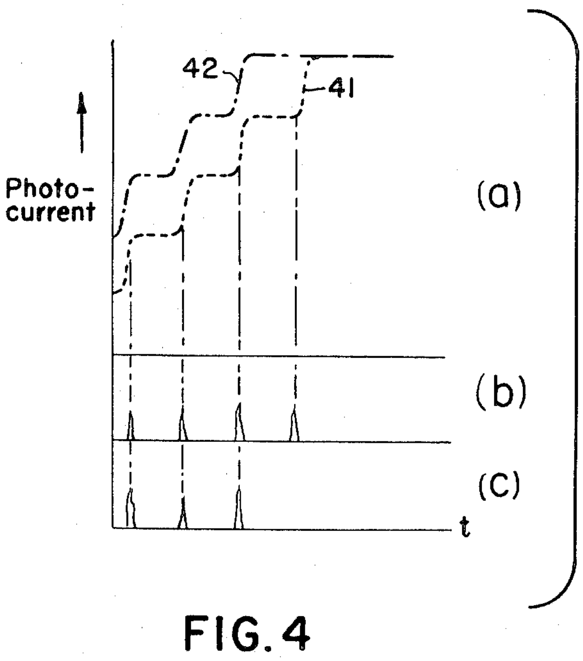

As will be understood from the above description, the waveform of FIG. 3 is obtained when the voltage distribution at bleeder resistor 15 is that as shown by straight line 21. Assuming that the control voltage supplied from the source 17 is decreased by $(1/2)V_{th}$ (which is equal to a quarter of the output voltage $V_B$ of the voltage source 16) the voltage distribution along resistor 15 is shifted to the state shown by the broken line 22 (FIG. 2) such that a voltage as high as a gate threshold voltage of the FET's is caused to shift from 15*a* to tap 15*b*. When this occurs both FET's $Q_1$ and $Q_2$ are turned to the on state at the beginning of scanning by the operation of the sawtooth wave. Since the photocurrent variation following the turning on of FET Q1 is exactly the same as that of FIG. 2, the total photocurrent change is as shown by curve 41 in FIG. 4(*a*), and the video output component is as shown in FIG. 4(*b*).

Likewise, if the voltage distribution at resistor 15 is further lowered by $(1/2)V_{th}$, as shown by the broken line 23 (FIG. 2), the tap maintained at the gate threshold voltage is caused to shift from tap 15*b* to tap 15*c*. As a result, FET's $Q_1$, $Q_2$, and $Q_3$ are in the on state at the beginning of scanning by the sawtooth wave. Thus, the total optical current varies as shown by curve 42 in FIG. 4(*a*), and the differentiated current variation is therefore as shown in FIG. 4(*c*).

As is apparent from the foregoing description, the scanning-starting point on the diode array can be controlled in response to the control voltage supplied from control signal source 17 in response to the command signal supplied from command signal source 18. The control signal can be synchronized with the sawtooth wave and lasts for the same period as the latter. It follows, therefore, that the random control of the scanning point or, in other words, random access of OCR, is made possible by the present circuit arrangement.

FIG. 5 illustrates in greater detail the design of control signal source 17, in which a serial binary command signal is supplied from the command signal source 18 (FIG. 1) to a binary counter 170. The command signal is counted down and, at the same time, converted into parallel binary outputs $S_o$, $S_1$, and $S_2$. These outputs are coupled to the junctions of diode 171–resistor 172, diode 173–resistor 174, and diode 175–resistor 176, respectively through diodes 171′, 173′ and 175′. The other ends of diodes 171, 173 and 175 are connected via a resistor 177 to the anode of a constant voltage source 178, while those of resistors 172, 174, and 176 are connected to the cathode of another constant voltage source 179. The cathode of voltage source 178 and the anode of source 179 are grounded in common. A common junction 180 of diodes 171, 173 and 175 is connected to the tapped resistor 15 (FIG. 1). As will be seen, the potential at junction 180 is controlled by the state of the binary outputs $S_o$, $S_1$ and $S_2$ and is thus responsive to the command signal supplied from the signal source 18.

Referring further to FIG. 5 and also to FIG. 1, the output of the differentiating circuit 14 may be fed back to the command signal source 18. In such a case, the source 18 generates the command signal to decide where to start the scanning on the basis of the video output fed back thereto.

In the foregoing description, it has been assumed that the photodiode array is made up of only five diodes. It will be apparent that the number of photodiodes may be increased arbitrarily.

As was previously mentioned in the introductory part of the specification, the circuit arrangement of the invention is extremely well adapted to fabrication as an integrated circuit. However, there is a limitation to the size of a silicon wafer. For a large area to be scanned, a plurality of such wafers must therefore be arranged side-by-side.

FIG. 6 illustrates a modification of the device of FIG. 1 that is particularly well adapted for the above-mentioned purpose. In FIG. 6, the circuit arrangements, here shown as three in number, 51*a*, 51*b*, 51*c*, are arranged side-by-side as shown. A sawtooth wave is supplied from the sawtooth wave source 56, and the document to be scanned and readout is caused to move by mechanical means (not shown) in the direction indicated by arrow 57.

The outputs of circuits 51*a*, 51*b*, and 51*c* are temporarily held at a holding circuit 58. The output is then time-sequentially derived from holding circuit 58 at an output terminal 61 in response to the synchronizing signal supplied to a gate circuit 59 from a synchronizing signal source 60.

This modification of FIG. 6 is advantageous in that the peak voltage of the sawtooth wave need not be as high as compared with the case where the number of photodiodes is increased in the arrangement of FIG. 1 to widen the scanning range. This brings about a significant advantage when the sawtooth wave generator is to be formed in a silicon substrate common to the scanning device portion, because an integrated circuit is not well suited for forming a high voltage sawtooth wave generator. The gate circuit 59 capable of operating at sufficiently high speeds may also be formed on the silicon wafer common to the scanning device portion. A detailed circuit structure of holding circuit 58 and gate circuit 59 is not described herein since the design of these circuits is well within the skill of those having ordinary skill in pulse and binary circuit design. In addition, in contrast to the modification of FIG. 6, the plurality of the unit scanning circuits 51 may be arranged side-by-side in the direction of the document movement.

It will thus be apparent to those skilled in the art that, in addition to those mentioned above, various other modifications are possible without departing from the spirit and scope of the invention.

We claim:

1. A random access solid state image scanner device comprising an array of field effect transistors, each having gate and source output and drain output electrodes; a plurality of photodiodes each having one terminal coupled respectively to one of the output electrodes of said field effect transistors; voltage supplying means for supplying a sawtooth wave in common to the remaining terminals of said photodiodes; means for supplying a controllable fixed voltage to the gate electrodes of each of said transistors, said controllable fixed voltage having a predetermined gradient with respect to said array; voltage controlling means for controlling said controllable fixed voltage in a predetermined timed relationship with said sawtooth wave so that the gate voltage at said transistors may be varied; and image output means coupled to the other output electrodes of said field effect transistors.

2. The image scanner of claim 1, in which said voltage supplying means comprises resistance means having a plurality of taps thereon respectively coupled to the gate electrodes of said transistors, and a voltage source coupled to the ends of said resistance means.

3. The image scanner of claim 2, in which said voltage controlling means comprises means coupled to one end of said resistance means for selectively shifting the voltage levels at said taps.

4. The image scanner of claim 3, in which the voltage level between adjacent ones of said taps is approximately $(1/2)V_{th}$, where $V_{th}$ is the gate threshold voltage of said field effect transistors.

5. The image scanner of claim 4, in which said voltage controlling means comprises means effective when operated in response to a command signal to shift the level at said taps by a value of approximately one gate threshold voltage.

6. The image scanner of claim 5, in which the slope of said sawtooth wave as a function of time is substantially equal to said predetermined voltage gradient.

7. The voltage source of claim 5, in which said voltage controlling means comprises a binary counter receiving said command signal, first and second voltage sources, a junction coupled to said voltage sources and to said one end of said resistance means, and a plurality of switching means coupled between said binary counter and said junction, said switching means being controlled by the output of said binary counter, whereby the voltage at said junction is controlled in response to the operation of said counter and thus to said command signal.

8. The image scanner of claim 6, wherein said image output means comprises differentiating means coupled to the other output electrodes of said transistors.

9. The image scanner of claim 1, in which the slope of said sawtooth wave as a function of time is substantially equal to said predetermined voltage gradient.

10. The image scanner of claim 9, in which said voltage supplying means comprises resistance means having a plurality of taps thereon respectively coupled to the gate electrodes of said transistors, and a voltage source coupled to the ends of said resistance means.

11. The image scanner of claim 10, in which said voltage controlling means comprises means coupled to one end of said resistance means for selectively shifting the voltage levels at said taps.

12. The image scanner of claim 1, wherein said image output means comprises differentiating means coupled to the other output electrodes of said transistors.

13. The image scanner of claim 1, further comprising command signal producing means responsive to the output of said photodiodes for controlling the operation of said voltage controlling means.

14. The image scanner of claim 8, further comprising means coupled to said differentiating means for controlling the operation of said voltage controlling means in response to the output level of said photodiodes.

* * * * *